Dec. 6, 1938.  W. F. ALLER  2,139,251
MEASURING INSTRUMENT
Filed March 1, 1937

INVENTOR
Willis Fay Aller
BY
Marichal + Noi
ATTORNEY

Patented Dec. 6, 1938

2,139,251

UNITED STATES PATENT OFFICE 2,139,251

MEASURING INSTRUMENT

Willis Fay Aller, Dayton, Ohio, assignor to The Sheffield Gage Corporation, Dayton, Ohio, a corporation of Ohio Application March 1, 1937, Serial No. 128,422

10 Claims. (Cl. 33—147)

This invention relates to measuring instruments and more particularly to measuring gages for accurately determining size relationships such as the height or diameter of a measured part with respect to a standard size or dimension.

One object of the invention is the provision of a measuring instrument having an indicator controlling mechanism operated by a plunger or the like which is rotatably adjustable for fine adjustments in setting, and which is axially movable for the operation of the indicator, the plunger being supported and held by adjusting mechanism embodying a comparatively few simple parts that are very readily and cheaply manufactured and assembled to produce a measuring instrument of great accuracy.

Another object of the invention is the provision of an instrument of the character mentioned in which the rotatably and axially movable plunger is held and supported by a simple spring member extending transversely of the plunger and mounted on a suitable holder which can be readily adjusted to provide axial as well as rotational adjustment of the plunger position.

Another object of the invention is the provision of a measuring gage having an adjusting and operating plunger supported in the manner mentioned, the plunger being operably connected to a movable bar or member which is supported by a plurality of springs and which is connected to an arcuately movable indicator member, the construction being devoid of lost motion and thus providing extremely accurate measurements for gaging operations.

Other objects and advantages of the invention will be apparent from the following description, the appended claims and the accompanying drawing, in which—

Figure 3:
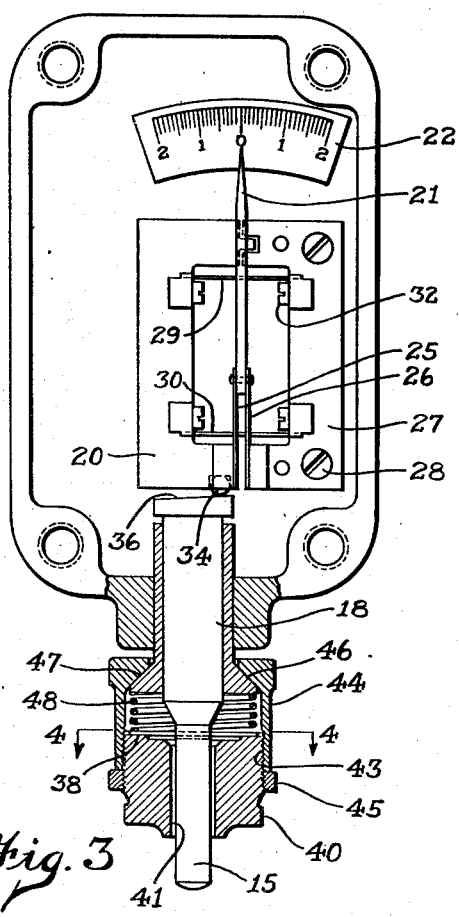
Fig. 3 is a vertical section taken on the line 3—3 of Fig. 1.
Figure 1:
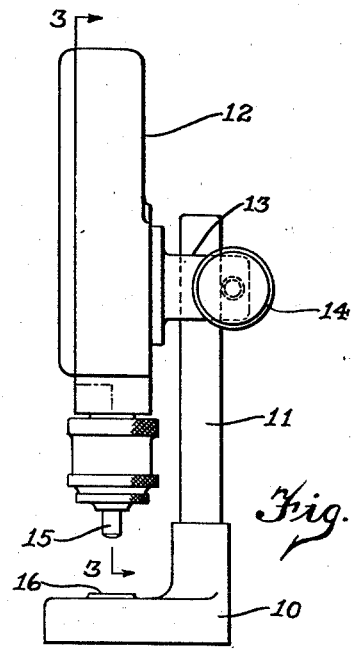
Fig. 1 is a side elevation of a measuring instrument embodying the present invention.
Figure 2:
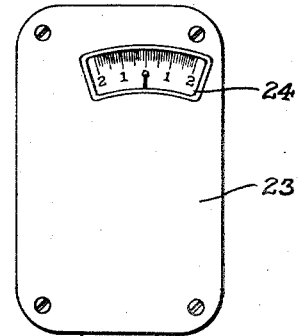
Fig. 2 is a front elevation of the same.
Figure 4:
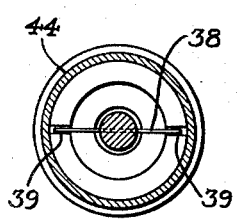
Fig. 4 is a section on the line 4—4 of Fig. 3.
Figure 5:
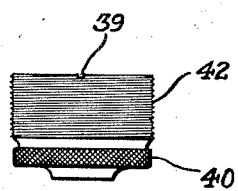
Fig. 5 is a side elevation of the rotatable spring holder.

Referring more particularly to the drawing by reference numerals, 10 designates the base and 11 the column of a measuring instrument such as a gage for accurately determining the amount that a specimen tested might be too large or too small with respect to a standard size. The indicating mechanism itself is contained in a housing 12. The rear of the housing is provided with a bracket 13 which can be clamped adjustably in any desired location along the column 11 as by means of the hand clamp 14. In this way the work contacting plunger 15 is arranged substantially the desired distance above the anvil 16.

The work contacting plunger 15 is adapted to bear against the upper side of a work specimen, and if the specimen is slightly oversize the plunger 15 will be moved upwardly, sliding within its fixed supporting guide 18 that is fixed in the housing, and moving an operated bar-like member 20 which is connected to an indicator pointer 21. A scale 22 cooperates with the pointer 21, the scale being suitably supported by the housing 12 back of the front cover plate 23 which is detachably secured by suitable attaching screws to the front corner portions of the housing. The cover plate 23 is provided with a window 24 through which the scale can be observed. The amount that the specimen departs from standard size will be greatly amplified and can be observed by viewing the indicator's position.

As herein shown the mechanism by which the indicator 21 is directly operated, and which is interposed between the indicating pointer and the work contacting plunger 15 is one in which all lost motion and play is entirely eliminated. Thus the pointer 21 is supported on a pair of rather closely spaced parallel spring blades or reeds 25 and 26, the blade 26 being rigidly secured to a fixed supporting block 27 which is secured by means of suitable supporting screws 28 threaded into the rear wall of the housing 12. The blade 25 is secured fixedly to the movable bar-like member 20, the latter being connected to the supporting block 27 by means of parallel spring bars 29 and 30, the ends of which are rigidly fastened into the parts 20 and 27 by means of attaching clamp members 32. The spring bars 29 and 30 mount the part 20 for movement in a direction substantially parallel to the length of the spring blades 25 and 26, or parallel to the axis of the plunger 15. Any movement of the plunger 15 in the direction of its length, imparted to the bar 20 through a force transmitting ball 34 that is arranged out of axial alignment with the plunger axis is magnified a great many times and indicated by the deflection of the pointer 21, and since the motion is transmitted either by direct pressure contact as in the case of the ball 34, or by flexing of members which are secured rigidly at their ends, it will be apparent that the movement of the pointer 21 very accurately indicates the motion imparted to the end of the plunger 15 but on a greatly magnified scale, lost motion being entirely eliminated in the parts.

The upper end of the plunger 15 is provided with an inclined or cam face 36 so that rotational movements of the plunger 15 about its own axis will produce a variation in the location of the ball 34 thus effecting the initial setting of the pointer 21. The means for supporting the plunger 15 is such as to permit the rotational setting of the plunger to be quickly and readily changed by the operator, and is also adapted to hold up the plunger 15 in a yielding manner far enough to maintain the ball 34 in contact with the cam face 36, and counterbalance the weight of the parts acting downwardly on the work, during the gaging operation.

The means for the adjustable support of the plunger 15 is an especially desirable construction in which its various parts can be readily and cheaply made as by simple screw machine operations. This plunger supporting and adjusting mechanism, which may be employed in conjunction with plungers that operate other kinds of mechanisms for the control of a pointer or the like, is shown more clearly in Fig. 3. The plunger 15 is carried by a member 38 extending transversely of the plunger 15, opposite sides of the member 38 being carried by a holder 40 which is adjustable axially on a hand operated barrel 44 by which it is supported on the support 18. The barrel 44 may be turned to turn the holder and member 38 and thus adjust the plunger rotationally without moving it axially, or by moving the holder on the barrel 44 the plunger may be adjusted in an axial direction to provide the desired longitudinal location of the plunger.

As herein shown the member 38 which carries the plunger 15 is a spring bar or wire that passes centrally and transversely through a hole in the plunger 15. The ends of the spring bar 38 rest in seats 39 provided in definite locations in the holder 40 which is preferably a metal member having an internal bore 41 that is spaced some little distance from the outside of the lower end of the plunger, the holder 40 also being provided with external screw threads 42 in threaded engagement with the internal threads 43 on a barrel or sleeve 44. A lock nut 45 can be tightened against the end of the barrel 44 so as to secure the barrel to the holder 40. The upper end of the barrel 44 is provided with a conical seat 46 frictionally engaging the conical surface 47 on the lower end of the support 18 in which the plunger is guided. It will thus be apparent that the barrel or sleeve 44 can be readily grasped by the operator and turned on its own axis without moving the plunger itself in the direction of its length, but producing a rotational movement of the plunger through the spring bar 38. The plunger is thus moved for adjustment of the indicating pointer 21 through the operation of the inclined surface 36. A helical spring 48 bears against the lower end of the support 18 and against the upper side of the holder 40, yieldingly holding these parts in any position to which the holder is turned.

The perfectly symmetrical support for the work contacting plunger 15 provides for free flexing movements of the spring 38 while giving a support for the plunger which is of a yielding character and exactly balanced on opposite sides, and in a construction in which the parts are readily made and assembled.

The construction as just described also provides a compensating adjustment which locates the plunger accurately in the direction of its length to maintain the upper end of the plunger in engagement with the ball 34 and counterbalance the weight of the various parts, as the lock nut 45 can be readily loosened so as to move the holder 40 axially by threading the barrel 44 along the holder 40 while the latter is held against rotation. This is effective in raising or lowering the spring 38 which in turn determines the longitudinal location of the plunger.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a measuring instrument of the character described, a support, an adjusting plunger mounted for axial movement in said support and having a transverse hole therethrough, indicating means operated by axial movements of said plunger, said plunger being rotatably adjustable in said support to vary the setting of the indicating means, a straight elongated pin extending through the hole in said plunger, a holder having sockets in which the ends of said pin are located, and hand operated means axially adjustable with relation to said holder for rotatably adjusting said holder for the rotatable adjustment of said plunger.

2. In a measuring instrument of the character described, a support, an adjusting plunger mounted for axial movement in said support, indicating means operated by axial movements of said plunger, said plunger being rotatably adjustable in said support to vary the setting of the indicating means, a member extending transversely through said plunger, a holder for said member, and a barrel rotatably mounted on said support and having an adjustable threaded connection to said holder.

3. In a measuring instrument of the character described having an adjusting plunger rotatably adjustable and axially operable for a gaging operation, a spring bar extending transversely of said plunger and providing a yielding support for said plunger, a holder in which the ends of the spring bar are mounted, a sleeve having internal threads engaging said holder, stationary means rotatably supporting said sleeve, and spring means yieldingly restraining rotation of said holder and also operating to yieldingly restrain said holder from axial movement.

4. In a measuring device of the character described, an operated member, actuating means for said member comprising an adjusting means axially movable to impart operating movements to the operated member and rotatably adjustable to impart adjusting movements to said operating member, an elongated resilient bar extending transversely through the center of said adjusting plunger, a holder having seats receiving the ends of said bar and having external threads, a sleeve internally threaded and engaging the external threads on said holder, a support in which the plunger is guided and having an extension rotatably supporting said sleeve, and a coil spring yieldingly holding said plunger against rotation.

5. In a measuring instrument of the character described, an indicator, an operated member operably connected to said indicator, an adjusting plunger axially movable to impart operating movement to said operated member, means extending transversely of said plunger and supporting said plunger, a support slidably supporting said adjusting plunger for axial movements, a manually operated member and a supporting member for holding said means rotatable together on said support to rotate said plunger while maintaining the axial position of the plunger, said last named members having a telescoping connection for adjusting the axial position of the plunger.

6. In a measuring instrument of the character described, an indicator, an operated member operably connected to said indicator, an adjusting plunger axially movable to impart operating movement to said operated member, a spring supporting said plunger, a support slidably supporting said plunger, a holding member supporting opposite sides of said spring, and means for mounting said holding member for bodily axial movement in the direction of the plunger axis and for rotational movement on said support in a fixed axial location.

7. In a measuring instrument of the character described, an indicator, an operated member operably connected to said indicator, an adjusting plunger axially movable to impart operating movement to said operated member, said plunger having cam means at one end in engagement with said operated member for moving the operated member upon rotation of the plunger, a spring supporting said plunger, a support slidably supporting said plunger, a holding member supporting opposite sides of said spring, and means for mounting said holding member for bodily axial movement in the direction of the plunger axis and for rotational movement on said support in a fixed axial location.

8. In a measuring instrument of the character described, an indicator member, a pair of closely spaced spring blades providing a common support for said indicator member, a fixed support for one of said blades, a block secured to the other of said blades and having a plurality of yielding attachments to said support providing movement of said block substantially in the normal direction of the said blades, a plunger having an end face inclined to the plunger axis and engaging said block at a point out of axial alignment with the plunger axis, a guide member supporting said plunger for axial movements, means extending transversely of said plunger for supporting the same, a holding member supporting opposite sides of said means, and means for mounting said holding member for bodily axial movement in the direction of the plunger axis and for rotational movement on said support in a fixed axial location.

9. In a measuring instrument of the character described, an indicator, an operated member operably connected to said indicator, an adjusting plunger axially movable to impart operating movements to said operated member and having adjustment means for moving the operated member upon rotation of said plunger, means extending transversely of said plunger and supporting said plunger, a support slidably supporting said plunger for axial movement, a manually operated member rotatably adjustable on said support, a supporting member having provision at definite fixed locations thereon at opposite sides of said plunger for supporting opposite portions of said means, an adjustable connection between said supporting member and said manually operated member for adjusting the axial position of said supporting member with respect to said manually operated member, and means for securing said manually operated member and said supporting member together for rotation together on said support to rotate said plunger while maintaining the axial position of the plunger.

10. In a measuring instrument of the character described, an indicator, an operated member operably connected to said indicator, an adjusting plunger axially movable to impart operating movements to said operated member and having adjustment means for moving the operated member upon rotation of said plunger, means extending transversely of said plunger and supporting said plunger, a support slidably supporting said plunger for axial movement, a supporting member having provision at definite fixed locations thereon at opposite sides of said plunger for supporting opposite portions of said means, said supporting member being rotatable to produce rotation of the plunger while maintaining its axial location, and a member operably connecting said supporting member to said support, said last named member having a threaded portion for adjusting the axial position of said supporting member to move the plunger bodily.

WILLIS FAY ALLER.